United States Patent
Kawakami et al.

(10) Patent No.: US 9,945,516 B2
(45) Date of Patent: Apr. 17, 2018

(54) METHOD FOR PRESERVING QUALITY OF NITRIC OXIDE

(71) Applicant: SUMITOMO SEIKA CHEMICALS CO., LTD., Kako-gun, Hyogo (JP)

(72) Inventors: Junichi Kawakami, Hyogo (JP); Akira Okabe, Hyogo (JP); Masahiro Komatsu, Hyogo (JP); Yukiyoshi Sawatani, Hyogo (JP)

(73) Assignee: SUMITOMO SEIKA CHEMICALS CO., LTD., Kako-gun (JP)

( * ) Notice: Subject to any disclaimer, the term of this patent is extended or adjusted under 35 U.S.C. 154(b) by 389 days.

(21) Appl. No.: 14/769,934

(22) PCT Filed: Sep. 4, 2013

(86) PCT No.: PCT/JP2013/073787
§ 371 (c)(1),
(2) Date: Aug. 24, 2015

(87) PCT Pub. No.: WO2014/155770
PCT Pub. Date: Oct. 2, 2014

(65) Prior Publication Data
US 2016/0003414 A1    Jan. 7, 2016

(30) Foreign Application Priority Data
Mar. 27, 2013    (JP) ................... 2013-066132

(51) Int. Cl.
*F17C 5/06*       (2006.01)
*C01B 21/24*      (2006.01)

(52) U.S. Cl.
CPC ............... *F17C 5/06* (2013.01); *C01B 21/24* (2013.01); *F17C 2201/0104* (2013.01);
(Continued)

(58) Field of Classification Search
CPC ................... F17C 5/06; F17C 2270/01; F17C 2227/0337; F17C 2225/035;
(Continued)

(56) References Cited

U.S. PATENT DOCUMENTS 6,109,260 A * 8/2000 Bathe .................... A61M 16/10
128/203.12
2015/0159808 A1* 6/2015 De Villemeur ........... F17C 1/00
220/581

FOREIGN PATENT DOCUMENTS

JP          10-36273 A      2/1998
WO     2012/170843 A1    12/2012

OTHER PUBLICATIONS

Tsukahara et al., "Gas-Phase Oxidation and Disproportionation of Nitric Oxide", Methods in Enzymology, 2002, vol. 359, pp. 168-179, Cited in ISR.
(Continued)

*Primary Examiner* — Timothy L Maust
*Assistant Examiner* — Timothy P Kelly
(74) *Attorney, Agent, or Firm* — Westerman, Hattori, Daniels & Adrian, LLP

(57) ABSTRACT

A method provide high-purity nitric oxide by preserving quality of the nitric oxide by suitably inhibiting the disproportionation reaction of the nitric oxide that is transported in a state of being stored in a high-pressure gas cylinder, and decreasing the amount of nitrous oxide and nitrogen dioxide that are produced during the transportation. When the nitric oxide is transported in a state of being stored in the high-pressure gas cylinder, the nitric oxide is filled into the high-pressure gas cylinder at a gauge pressure between 1.96 MPa to 3.5 MPa to be stored, and is transported in a state in which the exterior surface temperature of the high-pressure gas cylinder is held in a range from −15° C. to 5° C.

4 Claims, 1 Drawing Sheet

(52) U.S. Cl.
CPC .. *F17C 2221/01* (2013.01); *F17C 2223/0123* (2013.01); *F17C 2225/0123* (2013.01); *F17C 2225/035* (2013.01); *F17C 2227/0337* (2013.01); *F17C 2270/01* (2013.01)

(58) Field of Classification Search
CPC ...... F17C 2225/0123; F17C 2223/0123; F17C 2221/01
See application file for complete search history.

(56) References Cited

OTHER PUBLICATIONS

Melia, "Decomposition of Nitric Oxide at Elevated Pressures", Journal of Inorganic and Nuclear Chemistry, 1965, vol. 27, pp. 95-98, Cited in ISR.

Yuan et al., "Kinetics of the Decomposition of Nitric Oxide in the Range 700-1800° C.", J. Phys. (1959), Chem., vol. 63, 952-956.

Tsukahara et al., "Gas-Phase Disproportionation of Nitric Oxide at Elevated Pressures", Free Radical Research, 2003, vol. 37(2) 171-177.

International Search Report dated Nov. 26, 2013, issued in counterpart Application No. PCT/JP2013/073787 (2 pages).

\* cited by examiner

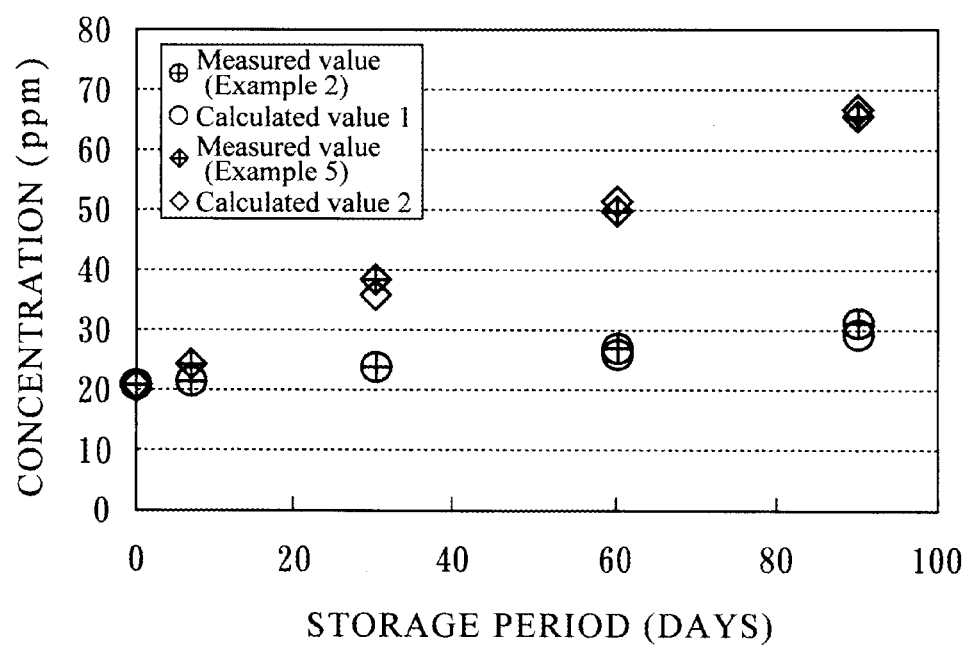

METHOD FOR PRESERVING QUALITY OF NITRIC OXIDE

TECHNICAL FIELD

The present invention relates to a method for preserving quality of nitric oxide (NO), which is suitable for preserving the quality during transportation when the nitric oxide used in, for example, medical therapy and production of semiconductors is transported in a state of being stored in a high-pressure gas cylinder.

BACKGROUND ART

Crude nitric oxide is produced industrially by various known methods, such as the ammonia oxidation method, the reaction of sodium nitrite and ferrous chloride, or the reaction of nitric acid and sulfur dioxide. High-purity nitric oxide is produced by removing acid gas by means of adsorbent or alkaline aqueous solution and removing water and others by means of adsorbent from the crude nitric oxide. Nitric oxide having a purity of at least 99.95% in a state of being filled in a high-pressure gas cylinder is commercially available in recent years for the medical therapy use, semiconductor material, and so forth.

Such nitric oxide is a thermodynamically unstable material, so that reduction of purity is caused by disproportionation reaction occurring partially in the high-pressure gas cylinder. To be more precise, the disproportionation reaction represented by the following reaction equation (1) occurs in the high-pressure gas cylinder, so that the nitric oxide is converted into nitrous oxide $N_2O$) and nitrogen dioxide ($NO_2$) that is equimolar to the nitrous oxide.

$$3NO \rightarrow NO_2 + N_2O \tag{1}$$

Non-patent Document 1 discloses that the production rate of nitrous oxide and nitrogen dioxide due to the disproportionation reaction at pressures of 200 atm and above is represented by the following equation (2), and the disproportionation rate increases when the temperature or pressure is increased.

Here, k' is the reaction rate constant, d/dt is the time derivative, and [NO], [$N_2O$], and [$N_2O$] are the molar concentrations of nitric oxide, nitrogen dioxide, and nitrous oxide respectively.

Non-patent Document 2 discloses the relationship between the disproportionation reaction of nitric oxide and the temperature in a high temperature region from 700° C. to 1800° C.

Non-patent Document 3 discloses the amounts of nitrous oxide and nitrogen dioxide that are produced, for example, when nitric oxide is left to stand for 1 month at 298 K and 10 atm.

PRIOR ART DOCUMENTS

Non-Patent Documents

Non-patent Document 1: T. P. MELIA, J. Inorg. Nucl. Chem., 27, 95-98 (1965)
Non-patent Document 2: Yuan, E. L., Slaughter, J. I., Koerner, W. E. and Daniels, F. J. Phys. Chem., 63, 952-956 (1959)
Non-patent Document 3: H. TSUKAHARA., T. ISHIDA., Y. TODOROKI., M. HIRAOKA. and M. MAYUMI., Free Radical Research, 2003, Vol. 37(2) 171-177

SUMMARY OF INVENTION

Problem to be Solved by the Invention

It is occasionally required for 1 week to 1 month to deliver a high-pressure gas cylinder filled with nitric oxide to a consumer, because impurity analysis after the filling, inspection of the style of packing, transportation from the shipping point to the delivery site, and so forth are required. As a result, the purity of nitric oxide decreases while it is stored in the high-pressure gas cylinder, because the disproportionation reaction of nitric oxide proceeds with the lapse of time. Further, the production rate of nitrous oxide and nitrogen dioxide due to the disproportionation of nitric oxide is increased with increasing in temperature. Furthermore, since the production rate of nitrous oxide and nitrogen dioxide due to the disproportionation reaction is influenced by temperature, the impurity concentrations is varied according to the variation of temperature during the transportation, in an example where the nitric oxide is used for production of semiconductors, there is a risk that the quality of the semiconductors is affected.

For example, when a high-pressure gas cylinder is transported in a state of being contained in a container that is directly exposed to sunlight during the hot summer season, the temperature in an ordinary container rises and occasionally exceeds 40° C. Again, when it is transported to abroad by ship, since legal regulations require that the container for transporting nitric oxide is placed on the deck and the customs clearance must be obtained twice, the purity of nitric oxide is reduced due to the temperature rise in the container and the lengthy period required for the transportation. Therefore, there is a risk that the concentrations of nitrous oxide and nitrogen dioxide in the nitric oxide stored in the high-pressure gas cylinder exceeds the permissible concentrations set by quality standards and others.

If the temperature of the high-pressure gas cylinder is held as low as possible, the reduction in purity of nitric oxide can be prevented. However, the energy cost for refrigeration is increased when the temperature is held lower than necessary. Moreover, suitable conditions for inhibiting the disproportionation of nitric oxide filled in a high-pressure gas cylinder cannot be found from the prior art. To be more precise, in Non-patent Document 1, although the relationships of the disproportionation rate at pressures of 200 atm and above are disclosed, the amount of production of nitrous oxide or nitrogen dioxide in the vicinity of usual pressure for filling nitric oxide (for example, 20 atm to 35 atm) is not disclosed. In Non-patent Document 2, there is no disclosure of relationship between the usual holding temperature of the high-pressure gas cylinder filled with nitric oxide and the disproportionation reaction of nitric oxide. Non-patent Document 3 discloses the amount of production of nitrous oxide and nitrogen dioxide due to the disproportionation in the vicinity of 20 atm that is a usual pressure for filling nitric oxide, this datum however lacks reliability because it is extrapolated based on experiments at, for example, 200 atm described in Non-patent Document 1.

Considering the prior art as described above, the object of the present invention is to provide a method that can preserve quality of nitric oxide by suitably inhibiting the progress of disproportionation reaction when the nitric oxide is transported in a state of being stored in a high-pressure gas cylinder.

Means for Solving the Problem

One aspect of the present invention is based on a finding that when nitric oxide is filled into a high-pressure gas cylinder at a filling pressure between 1.96 MPa and 3.5 MPa indicated in gauge pressure and the surface temperature of the high-pressure gas cylinder is held in the range from −15° C. to 35° C. a highly reliable empirical formula can represent a relationship between production rate of nitrous oxide or nitrogen dioxide due to disproportionation reaction of nitric oxide in the high-pressure gas cylinder, filling pressure, and surface temperature of the high-pressure gas cylinder. From this empirical formula, it has been found that the disproportionation reaction of nitric oxide in the high-pressure gas cylinder can be effectively inhibited when the nitric oxide is transported in a state of being stored in the high-pressure gas cylinder, by filling the nitric oxide into the high-pressure gas cylinder at a gauge pressure between 1.96 MPa and 3.5 Mpa to be stored, and transporting in a state in which the exterior surface temperature of the high-pressure gas cylinder is held in a range from −15° C. to 5° C. As a result, it is possible to preserve quality of nitric oxide by preventing the reduction and variation in purity, without holding the temperature of nitric oxide, which is filled into the high-pressure gas cylinder at a usual filling pressure, lower than necessary.

In another aspect of the present invention, an empirical formula that represents a relationship between production rate of nitrous oxide or nitrogen dioxide due to disproportionation reaction of nitric oxide in a high-pressure gas cylinder, pressure for filling the nitric oxide into the high-pressure gas cylinder, and exterior surface temperature of the high-pressure gas cylinder is determined, and the pressure for filling the nitric oxide into the high-pressure gas cylinder and the exterior surface temperature of the high-pressure gas cylinder are set from the determined empirical formula, a period of storage of the nitric oxide in the high-pressure gas cylinder, and a permissible value of concentration increment of the nitrous oxide or nitrogen dioxide at the time when the period of storage has passed. As a result, the purity of nitric oxide can be prevented from deviating from a desired permissible range, by adjusting the exterior surface temperature of the high-pressure gas cylinder according to the period of storage of the nitric oxide in the high-pressure gas cylinder and the filling pressure.

The empirical formula is preferably represented by the following formula (3), $$V = AP^3 e^{(-B/(RT))} \quad (3)$$

in which V (ppm/day) stands for increment per day of the concentration (volumetric ratio) of the nitrous oxide or nitrogen dioxide that is produced by the disproportionation reaction of nitric oxide in the high-pressure gas cylinder, P(MPa) indicated in gauge pressure stands for the pressure for filling the nitric oxide into the high-pressure gas cylinder, T (K) indicated in absolute temperature stands for the exterior surface temperature of the high-pressure gas cylinder, R stands for the gas constant, A stands for an experimentally determined constant, and B stands for an experimentally determined activation energy.

By means of formula (3), the increment V per day of the concentration, that is, the production rate of nitrous oxide or nitrogen dioxide due to the disproportionation reaction can be calculated from the filling pressure P and the surface temperature T of the high-pressure gas cylinder. The filling pressure P and the surface temperature T of the high-pressure gas cylinder are preferably determined so that the concentration increment, that is a product of the increment V per day and the period of storage of nitric oxide in the high-pressure storage cylinder, is equal to or less than the permissible value.

In the present invention, the high-pressure gas cylinder is preferably transported in a state of being contained in a container that has a temperature-regulating mechanism for the storage room. As a result, it is possible to lower the exterior surface temperature of the high-pressure gas cylinder in the container even in an environment of high atmospheric temperature, and thus the disproportionation rate during the transportation is decreased and the production amount of nitrous oxide and nitrogen dioxide can be lessened.

Effect of the Invention

According to the present invention, it is possible to contribute to provide high-purity nitric oxide with preserving quality of nitric oxide, by suitably inhibiting the disproportionation reaction of the nitric oxide that is transported in a state of being stored in a high-pressure gas cylinder, and decreasing the amount of nitrous oxide and nitrogen dioxide that are produced during the transportation.

BRIEF DESCRIPTION OF THE DRAWINGS

FIG. 1 A diagram that shows a relationship between the concentration of nitrous oxide that is produced by the disproportionation reaction of nitric oxide in a high-pressure gas cylinder and the period of storage.

MODE FOR CARRYING OUT THE INVENTION

In the present invention, a usual seamless type high-pressure gas cylinder, for example, having a medium internal volume between 40 L and 48 L, formed by hot-forming from a seamless steel pipe made of heat-treated (quenched and tempered) manganese steel (STH12), having a polished inner surface, and equipped with a known cylinder valve on its metal nozzle is adopted as the high-pressure gas cylinder used for storing nitric oxide. As to the high-pressure gas cylinder, as long as nitric oxide gas can be filled at a pressure between 1.96 MPa and 3.5 MPa (gauge pressure), there are no particular limitations on the internal volume, forming method, inner surface roughness, and so forth, and a commercial product can be used, in addition, as to the material, it is not limited to the heat-treated manganese steel, so that aluminum alloy, chromium molybdenum steel, stainless steel, or the like may be used.

The filling of nitric oxide into the high-pressure gas cylinder is carried out at a filling pressure between 1.96 MPa and 3.5 MPa indicated in gauge pressure, the cylinder valve is closed after this filling, and thus nitric oxide is stored with holding the exterior surface temperature of the high-pressure gas cylinder in the range from −15° C. to 5° C. When the high-pressure gas cylinder filled with nitric oxide is transported in a state of being contained in a container, it is contained in a container having a temperature-regulating mechanism for the storage room, and is transported in a state in which the exterior surface temperature of the high-pressure gas cylinder is held in a range from −15° C. to 5° C. For example, the high-pressure gas cylinder is contained in a so-called reefer container, which is equipped with a refrigerator, so as to be placed vertically. The standard reefer container has a length of 20 feet (6096 mm) or 40 feet (12192 mm), but there are no limitations on its dimensions, material, method of power generation and refrigeration, method of ventilation, and so forth, as long as the container can regulate the exterior surface temperature of the contained high-pressure gas cylinder in the range from −15° C.

to 5° C. When the high-pressure gas cylinder is left to stand, the exterior surface temperature of the high-pressure gas cylinder may be regulated by being contained in, for example, an ordinary refrigerated warehouse having a temperature-regulating mechanism. Besides, although there is some time lag after which the temperature of nitric oxide in the high-pressure gas cylinder becomes equal to the temperature of the exterior surface of the gas cylinder, it is sufficient to manage the exterior surface temperature of the gas cylinder rather than nitric oxide itself, because the time lag is short in comparison to the period required for transportation of the high-pressure gas cylinder, and the amount of nitrous oxide and nitrogen dioxide produced by the disproportionation reaction during the time lag is negligibly smaller than that during the period of transportation.

Data measured of time series are obtained by carrying out experiments, in which nitric oxide gas is filled into the high-pressure gas cylinder at a set pressure to be stored, and the concentration of nitrous oxide or nitrogen dioxide present in this stored nitric oxide is measured at a set time interval after the start of the storage. For example, the concentration of nitrous oxide present in a fixed amount of nitric oxide gas drawn from the high-pressure gas cylinder is measured, by using a measurement instrument such as a gas chromatograph, at the time when the nitric oxide is initially filled into the high-pressure gas cylinder, and at 30 days, 60 days, and 90 days after the start of the storage respectively. The high-pressure gas cylinder is contained in, for example, a reefer container during the period of measurement with holding the exterior surface temperature constant. Further serial data measured of time series for the concentration obtained by such way are also obtained, with the difference of filling pressure and with the difference of exterior surface temperature of the high-pressure gas cylinder. In addition, the concentration of nitrogen dioxide may be measured because nitrous oxide and nitrogen dioxide produced by the disproportionation reaction are equal in molar amount.

By analyzing the experimentally obtained measurement data, the constant A and activation energy B in formula (3), which represents the relationship between production rate of nitrous oxide or nitrogen dioxide due to the disproportionation reaction of nitric oxide in the high-pressure gas container, pressure for filling nitric oxide into the high-pressure gas cylinder, and exterior surface temperature of the high-pressure gas cylinder, are determined. In the present embodiment the experimentally determined constant A is taken as $2.34 \times 10^7$ (ppm·day$^{-1}$·MPa$^{-3}$) and the activation energy B is taken as 46411 (J·mol$^{-1}$), with using 8.314 (J·mol$^{-1}$·K$^{-1}$) as the gas constant R.

The pressure for filling nitric oxide into the high-pressure gas cylinder and the exterior surface temperature of the high-pressure gas cylinder are determined from formula (3) including the experimentally determined constant A and activation energy B, the period of storage of nitric oxide in the high-pressure gas cylinder, and the permissible value of concentration increment of nitrous oxide or nitrogen dioxide at the time when the period of storage has passed. In an example where a high-pressure gas cylinder filled with nitric oxide at a gauge pressure of 1.96 MPa is stored for 30 days, when the surface temperature T of the high-pressure gas cylinder is set to 261.15 K (−12° C.), the concentration increment of nitrous oxide or nitrogen dioxide calculated from formula (3) in the present embodiment is 2.7 ppm. In this case, since the permissible value of concentration increment is generally equal to or greater than 2.7 ppm, the filling pressure can be set at equal to or greater than 1.96 MPa (gauge pressure) and the surface temperature T of the high-pressure gas cylinder can be set at equal to or greater than 261.15 K, in the range where the calculated concentration increment does not exceed the permissible value. In addition, in a case where a high-pressure gas cylinder filled with nitric oxide at a gauge pressure of 3.5 MPa is stored for 30 days, when the surface temperature T of the high-pressure gas cylinder is set to 298.15 K (25° C.), the concentration increment of nitrous oxide or nitrogen dioxide calculated from formula (3) in the present embodiment is 220.3 ppm. In this case, when the permissible value of concentration increment is less than 220.3 ppm, at least one of the set values of the filling pressure and the surface temperature of the high-pressure gas cylinder should be lowered so as to make the calculated concentration increment equal to or less than the permissible value.

Besides, the values of the constant A and the activation energy B in formula (3) are not limited to those in the present embodiment. For example, the values of the constant A and the activation energy B may differ from those in the present embodiment according to differences of the number, measurement interval, and the like in the experimentally determined measurement data.

Example 1

High-purity nitric oxide gas was filled at a gauge pressure of 1.96 MPa into a seamless type high-pressure gas cylinder (made by Koatsu Showa Cylinders Co., Ltd., Clean High-Pressure Gas Cylinder) having an internal volume of 47 L, made of heat-treated manganese steel, and having a maximum height (Rz defined in JIS 0601-2001) of approximately 1.0 μm in the inner surface roughness of the cylinder barrel, and the cylinder valve was closed after the filling. Thus nitric oxide was stored in the high-pressure gas cylinder, which was left to stand in a state in which the exterior surface temperature was held at −15° C. in a reefer container. In the gas used as the high-purity nitric oxide gas, 20.3 ppm nitrous oxide and 5.4 ppm nitrogen dioxide were included from the beginning of the filling. The concentration of nitrous oxide present in the nitric oxide gas drawn from the high-pressure gas cylinder for 10 minutes at a flow rate of approximately 150 mL/minute was measured, by using a gas chromatograph (made by Shimadzu Corporation, GC-14B) equipped with a PDD (pulsed discharge detector), at 30 days, 60 days, and 90 days after the start of the storage in the high-pressure gas cylinder. Incidentally, although the pressure within the high-pressure gas cylinder was reduced by drawing the nitric oxide from the gas cylinder for the measurement of concentration, it could be neglected because the amount of pressure reduction was very few.

Example 2

The concentration of nitrous oxide was measured as in Example 1, with the exception that the exterior surface temperature of the high-pressure gas cylinder was held at −12° C.

Example 3

The concentration of nitrous oxide was measured as in Example 1, with the exception that the exterior surface temperature of the high-pressure gas cylinder was held at 5° C.

Example 4

The concentration of nitrous oxide was measured as in Example 1, with the exception that the pressure for filling nitric oxide gas into the high-pressure gas cylinder was set to a gauge pressure of 3.5 MPa.

Example 5

The concentration of nitrous oxide was measured as in Example 1, with the exceptions that the pressure for filling nitric oxide gas into the high-pressure gas cylinder was set to a gauge pressure of 3.5 MPa and the exterior surface temperature of the high-pressure gas cylinder was held at −12° C.

Example 6

The concentration of nitrous oxide was measured as in Example 1, with the exceptions that the pressure for filling nitric oxide gas into the high-pressure gas cylinder was set to a gauge pressure of 3.5 MPa and the exterior surface temperature of the high-pressure gas cylinder was held at 5° C.

Comparative Example 1

The concentration of nitrous oxide was measured as in Example 1, with the exception that the exterior surface temperature of the high-pressure gas cylinder was held at 25° C.

Comparative Example 2

The concentration of nitrous oxide was measured as in Example 1, with the exception that the exterior surface temperature of the high-pressure gas cylinder was held at 35° C.

Comparative Example 3

The concentration of nitrous oxide was measured as in Example 1, with the exceptions that the pressure for filling nitric oxide gas into the high-pressure gas cylinder was set to a gauge pressure of 3.5 MPa and the exterior surface temperature of the high-pressure gas cylinder was held at 25° C.

Comparative Example 4

The concentration of nitrous oxide was measured as in Example 1, with the exceptions that the pressure for filling nitric oxide gas into the high-pressure gas cylinder was set to a gauge pressure of 3.5 MPa and the exterior surface temperature of the high-pressure gas cylinder was held at 35° C.

Table 1 below represents the results of the concentration measurements in Examples 1 to 6 and Comparative Examples 1 to 4, and calculated values 1 and 2 of concentration, which were determined based on formula (3) using the constant A and the activation energy B in the above described embodiment under the same conditions as in Examples 2 and 5. FIG. 1 shows the relationships between the measured values of nitrous oxide concentration in Examples 2 and 5 and the storage period, and also shows the relationships between the calculated values 1 and 2 of concentration, which were determined based on formula (3) using the constant A and the activation energy B in the above described embodiment under the same conditions as in Examples 2 and 5, and the storage period. Besides, FIG. 1 shows measured values and calculated values which were additionally determined as in Examples 2 and 5 and in calculated values 1 and 2, with the difference that the storage period was set to 7 days. It can be confirmed from the examples and comparative examples that the concentration increment of nitrous oxide due to the disproportionation reaction is lowered by reducing the pressure for filling nitric oxide gas into the high-pressure gas cylinder and by lowering the exterior surface temperature of the high-pressure gas cylinder. It can also be confirmed that the concentration increment of nitrous oxide or nitrogen dioxide per day due to the disproportionation reaction of nitric oxide can be accurately extrapolated by using formula (3). It can be further confirmed that, when the exterior surface temperature of the high-pressure gas cylinder is held in the range from −15° C. to 5° C., excessive concentration increment of nitrous oxide or nitrogen dioxide does not occur during the usual period of transportation even if the pressure for filling nitric oxide into the high-pressure gas cylinder is set to a usual value between 1.96 MPa and 3.5 MPa (gauge pressure).

TABLE 1

| | Filling pressure (MPaG) | Storage temperature (° C.) | $N_2O$ Concentration (ppm) | | | |
|---|---|---|---|---|---|---|
| | | | Initial | 30 days storage | 60 days storage | 90 days storage |
| Example 1 | 1.96 | −15 | 20.3 | 22.6 | 25.1 | 26.2 |
| Example 2 | 1.96 | −12 | 20.3 | 23.8 | 26.9 | 30.8 |
| Example 3 | 1.96 | 5 | 20.3 | 29.8 | 39.6 | 50.2 |
| Example 4 | 3.5 | −15 | 20.3 | 31.4 | 45.1 | 57.8 |
| Example 5 | 3.5 | −12 | 20.3 | 38.5 | 49.8 | 65.6 |
| Example 6 | 3.5 | 5 | 20.3 | 81.7 | 146.3 | 204.9 |
| Comparative Example 1 | 1.96 | 25 | 20.3 | 61.5 | 92.7 | 149.6 |
| Comparative Example 2 | 1.96 | 35 | 20.3 | 86.0 | 152.9 | 231.7 |
| Comparative Example 3 | 3.5 | 25 | 20.3 | 230.1 | 422.5 | 651.8 |
| Comparative Example 4 | 3.5 | 35 | 20.3 | 439.5 | 855.0 | 1261.0 |
| Calculated value 1 | 1.96 | −12 | 20.3 | 23.0 | 25.7 | 28.5 |
| Calculated value 2 | 3.5 | −12 | 20.3 | 35.8 | 51.3 | 66.7 |

The invention claimed is:

1. A method for preserving quality of nitric oxide at a time when the nitric oxide is transported in a state of being stored in a high-pressure gas cylinder characterized by:
   filling the nitric oxide into said high-pressure gas cylinder at a gauge pressure between 1.96 MPa and 3.5 MPa to be stored, and
   transporting in a state in which the exterior surface temperature of said high-pressure gas cylinder is held in a range from −15° C. to 5° C.

2. A method for preserving quality of nitric oxide at a time when the nitric oxide is transported in a state of being stored in a high-pressure gas cylinder characterized by:
   setting the pressure for filling the nitric oxide into said high-pressure gas cylinder and the exterior surface temperature of said high-pressure gas cylinder from an empirical formula, a period of storage of the nitric oxide in said high-pressure gas cylinder, and a permissible value of concentration increment of the nitrous oxide or nitrogen dioxide at a time when the period of storage has passed,
   wherein said empirical formula represents a relationship between production rate of nitrous oxide or nitrogen dioxide due to disproportionation reaction of nitric oxide in said high-pressure gas cylinder, pressure for filling the nitric oxide into said high-pressure gas cylinder, and exterior surface temperature of said high-pressure gas cylinder, and wherein said empirical formula is $V=AP^3e^{(-B/(RT))}$ in which V (ppm/day) stands for an increment per day of the concentration (volumetric ratio) of the nitrous oxide or nitrogen dioxide that is produced by the disproportionation reaction of nitric oxide in said high-pressure gas cylinder, P (MPa) indicated in gauge pressure stands for the pressure for filling the nitric oxide into said high-pressure gas cylinder, T (K) indicated in absolute temperature stands for the exterior surface temperature of said high-pressure gas cylinder, R stands for a gas constant, A stands for an experimentally determined constant, and B stands for an experimentally determined activation energy.

3. The method for preserving quality of nitric oxide according to claim 1, wherein said high-pressure gas cylinder is transported in a state of being contained in a container having a temperature-regulating mechanism for a storage room.

4. The method for preserving quality of nitric oxide according to claim 2, wherein said high-pressure gas cylinder is transported in a state of being contained in a container having a temperature-regulating mechanism for a storage room.

\* \* \* \* \*